United States Patent [19]
Mosciatti

[11] Patent Number: 6,075,306
[45] Date of Patent: Jun. 13, 2000

[54] LAMINATED ROTOR FOR PERMANENT MAGNET BRUSHLESS MOTORS

[75] Inventor: Roger Mosciatti, Coram, N.Y.

[73] Assignee: MFM Technology L.L.C., Ronkonkoma, N.Y.

[21] Appl. No.: 09/223,310

[22] Filed: Dec. 30, 1998

[51] Int. Cl.⁷ .......................... H02K 1/22; H02K 21/12; H02K 1/06; H02K 15/00
[52] U.S. Cl. .................. 310/261; 310/156; 310/217; 310/42
[58] Field of Search ..................... 310/156, 217, 310/42, 67 R, 261

[56] References Cited

U.S. PATENT DOCUMENTS

| | | | |
|---|---|---|---|
| 902,720 | 11/1908 | Euker | 310/175 |
| 3,477,125 | 11/1969 | Schwartz | 29/596 |
| 4,777,397 | 10/1988 | Parshall | 310/156 |
| 4,833,353 | 5/1989 | Hansen | 310/51 |
| 5,013,957 | 5/1991 | Wrobel | 310/217 |

*Primary Examiner*—Nestor Ramirez
*Assistant Examiner*—Guillermo Perez
*Attorney, Agent, or Firm*—Lane, Aitken & McCann

[57] ABSTRACT

A rotor is comprised of laminations forced on a shaft that has two staking rails, which penetrate the laminations and create two holding points. The two staking rails are positioned on the shaft at an angle to force the lamination toward the center of the shaft and force it hard against a flat on the shaft. This assembly provides for "zero" rotational movement without additional steps in the manufacturing process. An additional feature of the assembly is that the flat on the shaft relates to flats on the rotor to which the permanent magnets are attached, and a flat on the shaft for mounting an encoder, which flats are all in the same plane. This allows the motor to be easily aligned, which is a requirement to properly phase motor rotation to motor commutation.

9 Claims, 2 Drawing Sheets

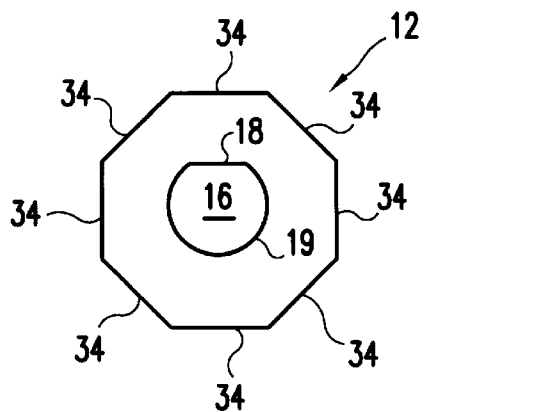
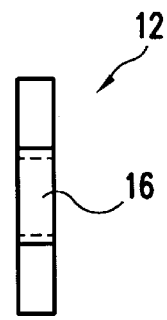
FIG1.A  FIG.1B
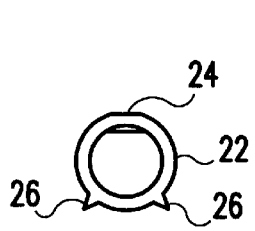
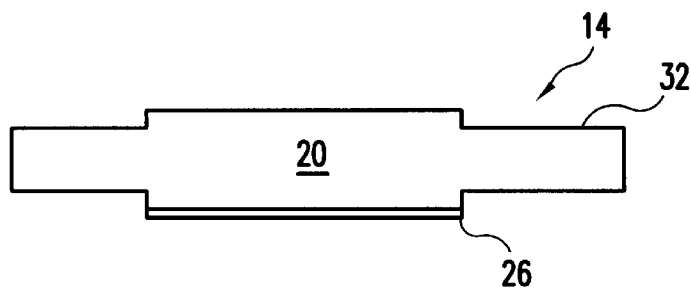
FIG.2B  FIG.2A
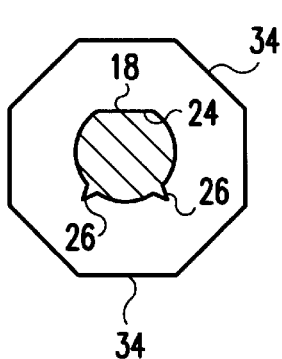
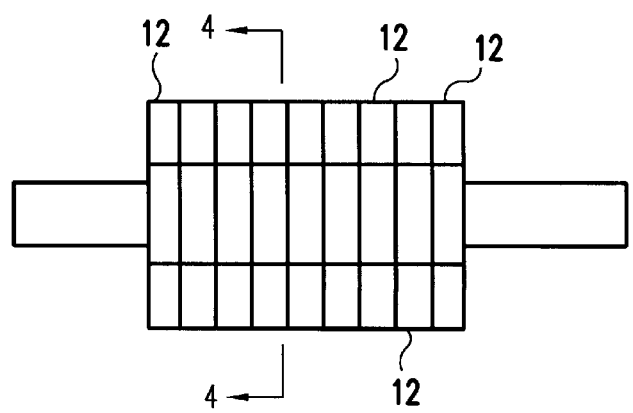
FIG.4  FIG.3

LAMINATED ROTOR FOR PERMANENT MAGNET BRUSHLESS MOTORS

BACKGROUND OF THE INVENTION

1. Field of the Invention

This invention relates to an improved rotor and shaft assembly for permanent magnet, brushless motors, and more particularly, to a high performance assembly that is inexpensive to manufacture.

The rotor in a permanent brushless motor is a critical component. The magnets are mounted on the rotor and the torque is transmitted to the motor output shaft via the rotor. A rotor-shaft assembly without slip is critical to proper operation in a servo motor application because the servo motor operates bi-directionally at full torque.

2. Description of the Prior Art

There are several prior art ways to secure the rotor to the shaft. Usually, in the prior art, the rotor is machined from solid steel stock. A key and key way can be used to lock the rotor to the shaft and prevent mechanical movement of the rotor relative to the shaft. The problem with this approach is that some clearance is required to slip fit the two parts together. Therefore, you have a built-in rotational play (i.e. slip) when the motor changes direction. Adhesive can be used to prevent slippage, but repairs are difficult to such assemblies and applying the adhesive requires additional labor. A thermal shrink fit can be used to secure the rotor to the shaft, but again this process requires labor, equipment, and it slows the manufacturing process.

SUMMARY OF THE INVENTION

An object of this invention is the provision of a rotor and shaft assembly that has no slippage between the rotor and shaft and has a low manufacturing cost.

Briefly, this invention contemplates a rotor comprised of laminations that are forced on a shaft that has two staking rails, which penetrate the laminations and create two holding points. The two staking rails are positioned on the shaft at an angle to force the lamination toward the center of the shaft and force it hard against a flat on the shaft. This assembly provides for "zero" rotational movement without additional steps in the manufacturing process. An additional feature of the assembly is that the flat on the shaft relates to flats on the rotor to which the permanent magnets are attached, and a flat on the shaft for mounting an encoder, which flats are all in the same plane. This allows the motor to be easily aligned, which is a requirement to properly phase motor rotation to motor commutation.

BRIEF DESCRIPTION OF THE DRAWINGS

The foregoing and other objects, aspects and advantages will be better understood from the following detailed description of a preferred embodiment of the invention with reference to the drawings, in which:

FIG. 1A is a front view of one exemplary embodiment of a single laminate used in the construction of a rotor and shaft assembly in accordance with the teachings of this invention.

FIG. 1B is a side view of the laminate shown in FIG. 1A.

FIG. 2A is a side view of one embodiment of a shaft used in the construction of a rotor and shaft assembly in accordance with the teachings of this invention.

FIG. 2B is an end view of the shaft shown in FIG. 2A.

FIG. 3 is a side view of a rotor and shaft assembled from the components shown in FIGS. 1 and 2.

FIG. 4 is a sectional view taken along the line 4—4 in FIG. 3.

DETAILED DESCRIPTION OF A PREFERRED EMBODIMENT

Figure 5:
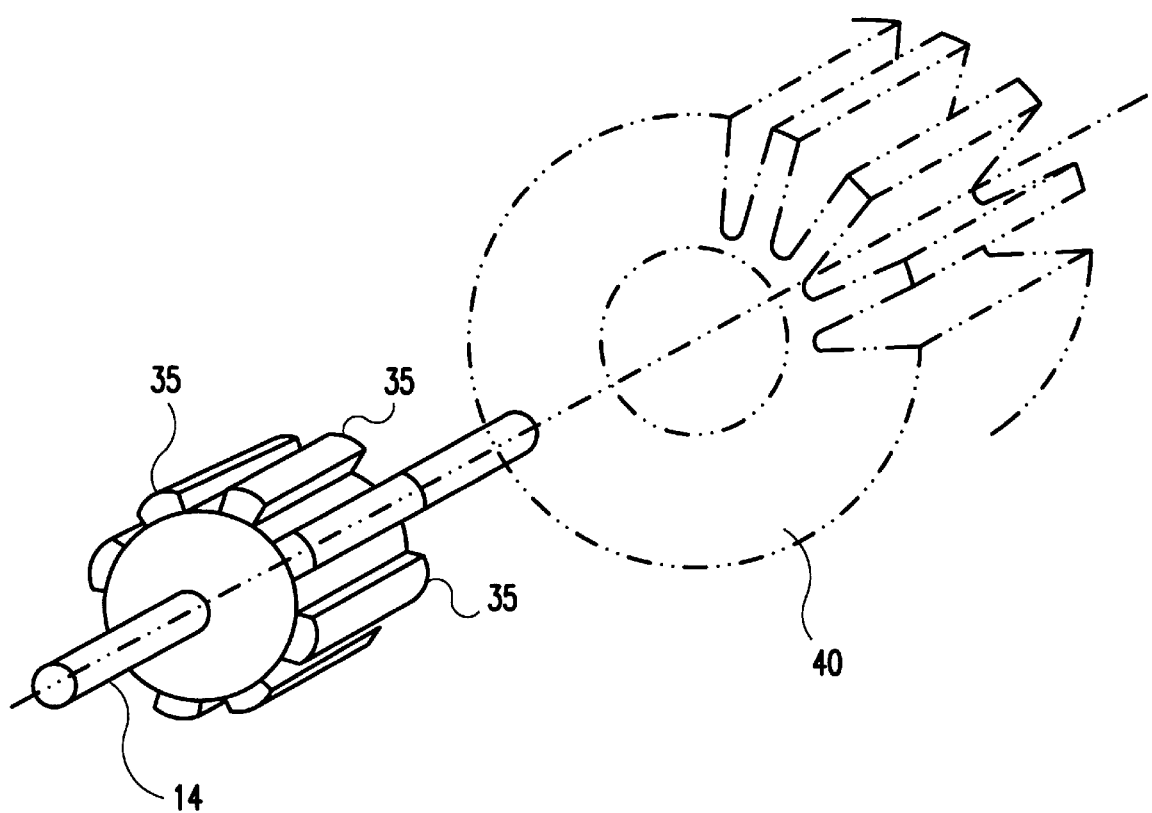
FIG. 5 is a perspective exploded view of an assembled armature and a stator structure.

Referring now to FIGS. 1, 2, 3 and 4, in accordance with the teachings of this invention, the rotor and shaft assembly for a permanent magnet motor is comprised of a stack of steel laminates 12 (shown in FIG. 1) forced onto a shaft 14 (shown in FIG. 2) with resultant assembly shown in FIGS. 3 and 4. Each laminate 12 has a central opening 16 with a reference surface 18 formed in the opening. In this specific embodiment of the invention, the wall 19 of the opening 16 is circular except a reference surface 18, which is flat. The peripheral surface of the central portion 20 of the shaft 14 has a circular surface 22 with a flat reference surface 24. The central portion is dimensioned so that each laminate can be slipped onto the central portion with a snug fit between the shaft and the laminate. The central portion 20 of the shaft 14 is formed with two staking rails or ridges 26. As will be appreciated, any of a number of prior art process and tool can be used conveniently to form the staking rails 26. These small pointed staking rails are preferably located on radii that form an angle of about sixty degrees and are located on the side opposite the reference surface 24 (i.e. the line that bisects the angle between the staking rails is perpendicular to the reference surface). Each laminate 12 is slipped, one at a time or as a complete stack, on to the central portion 20 of the shaft 14. As it is forced on to the central portion, the staking rails 26 cut into the surface of the wall 19 of the opening 16. The staking rails, by cutting into each laminate, force the reference surface of the laminate against the reference surface of the surface of the shaft and lock the laminates to the shaft eliminating rotational slippage from the assembly. Laminate 12 has a series of reference surfaces 34 around its outer peripheral surface on which the permanent magnets 35 (shown in FIG. 5) are mounted. The reference surfaces 34 (eight reference surfaces arranged in a regular octagon in this exemplary embodiment) are referenced to the reference surface 18 in the laminate opening. The shaft 14 has another reference surface 32 at one end of the shaft. This reference surface 32 is related to the reference surface 24 in the central portion 20 on the shaft 14; in a preferred embodiment of the invention the surfaces 32 and 24 are in the same plane. A shaft position encoder can be mounted on the shaft 14 oriented by the reference surface 32 which in turn references the encoder to the outer peripheral reference surfaces 34 to which the permanent magnets are attached. This facilitates establishing the correct phase relation between the output signals of the encoder, which is used to generate a commutation signal, and the angular position of the magnets. FIG. 5 shows the completed rotor and shaft assembly in combination with a stator structure 40 as these components would be assembled in a permanent magnet, brushless motor.

While the invention has been described in terms of a single preferred embodiment, those skilled in the art will recognize that the invention can be practiced with modification within the spirit and scope of the appended claims.

What is claimed is:

1. A permanent magnet rotor assembly comprising in combination:

a shaft;

a reference surface formed on said shaft in a region onto which a plurality of laminates are placed;

said plurality of laminates having an opening formed in each laminate and an inner reference surface in each said opening;

at least one striking rail on said shaft;

said plurality of laminates stacked on said shaft with each said striking rail cutting into said laminates and urging said reference surface formed in each opening into engagement with said reference surface formed on said shaft.

2. A permanent magnet rotor assembly as in claim 1 wherein said striking rail is formed integrally in an enlarged central portion of said shaft.

3. A permanent magnet rotor assembly as in claim 1 wherein there are two striking rails located opposite said reference surface.

4. A permanent magnet rotor assembly as in claim 3 wherein said striking rails are separated by about sixty degrees.

5. A permanent magnet rotor assembly as in claim 1 wherein each said reference surface is a flat surface.

6. A permanent magnet rotor assembly comprising in combination:

a shaft;

a reference surface formed on said shaft in a region onto which a plurality of laminates are placed;

said plurality of laminates having an opening formed in each laminate and an inner reference surface in each said opening;

at least one striking rail on said shaft;

said plurality of laminates stacked on said shaft with said striking rail cutting into said laminates and urging said reference surface formed in each opening into engagement with said reference surface formed on said shaft;

a plurality of outer permanent magnet reference surfaces formed on the outer surface of said laminates so that said outer reference surfaces are in a known, predetermined spatial relation to said inner reference surface;

a portion of said shaft, extending beyond said plurality of laminates, said portion of said shaft having an encoder reference surface disposed in a predetermined spatial relation to said inner reference surface;

a plurality of permanent magnetics secured to said outer permanent magnetic reference surfaces, whereby said encoder reference surface is in a predetermined spatial relationship to said permanent magnets.

7. A permanent magnet rotor assembly as in claim 6, wherein there are two striking rails located opposite said reference surface.

8. A permanent magnet rotor assembly as in claim 6, wherein said striking rails are separated by sixty degrees.

9. A permanent magnet rotor assembly as in claim 6, wherein each reference surface is a flat surface.

* * * * *